2 Sheets—Sheet 1.

E. MOREAU.

SEWING-MACHINE.

No. 7,005. Reissued March 21, 1876.

Witnesses:
Isaac Jessup
W. B. Isaacs.

Inventor.
Eugene Moreau

N. PETERS, PHOTO-LITHOGRAPHER, WASHINGTON, D. C.

E. MOREAU.
SEWING-MACHINE.
No. 7,005. Reissued March 21, 1876.
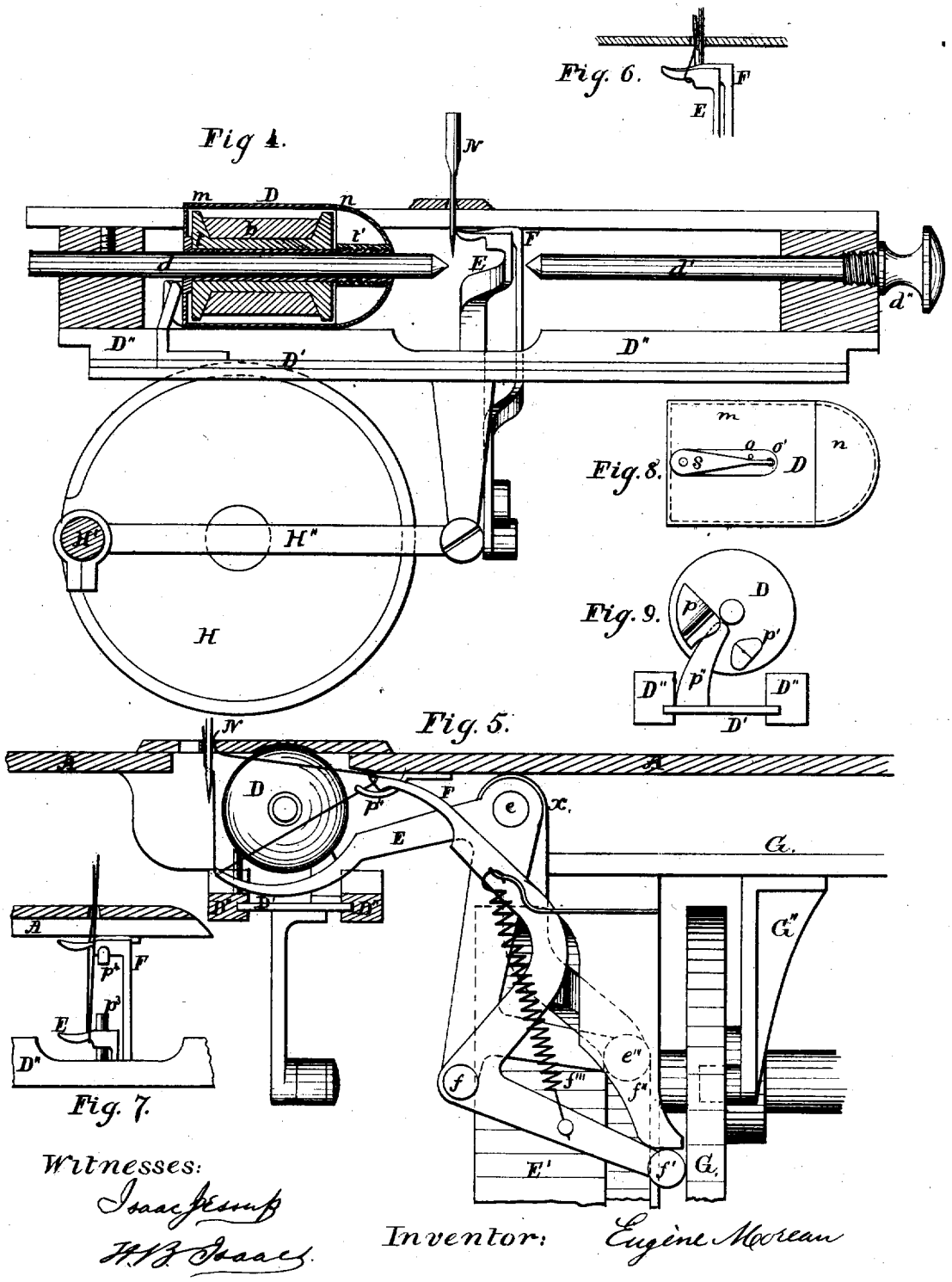
Witnesses:
Isaac Jessup
H. B. Isaac
Inventor: Eugène Moreau
N. PETERS, PHOTO-LITHOGRAPHER, WASHINGTON, D. C.

UNITED STATES PATENT OFFICE.

EUGÈNE MOREAU, OF SAN FRANCISCO, CALIFORNIA, ASSIGNOR TO THE MOREAU MACHINE MANUFACTURING COMPANY, OF SAME PLACE.

IMPROVEMENT IN SEWING-MACHINES.

Specification forming part of Letters Patent No. 156,171, dated October 20, 1874; reissue No. 7,005, dated March 21, 1876; application filed February 1, 1875.

*To all whom it may concern:*

Be it known that I, EUGÈNE MOREAU, of San Francisco, in the county of San Francisco and State of California, have invented certain Improvements in Sewing-Machines, of which the following is a specification:

The nature of my invention consists in the construction and arrangement of the parts of a sewing-machine, as more fully hereinafter set forth and claimed.

I shall now describe my invention more in detail with the use of the accompanying drawings.

Figure 1:
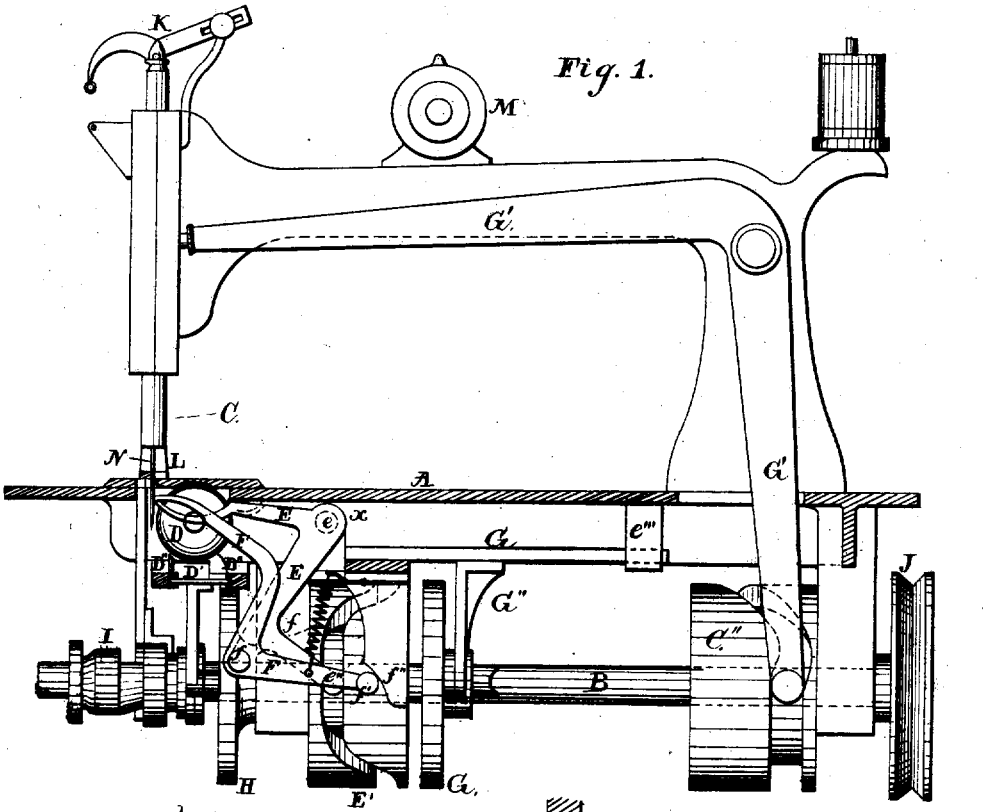
Figure 2:
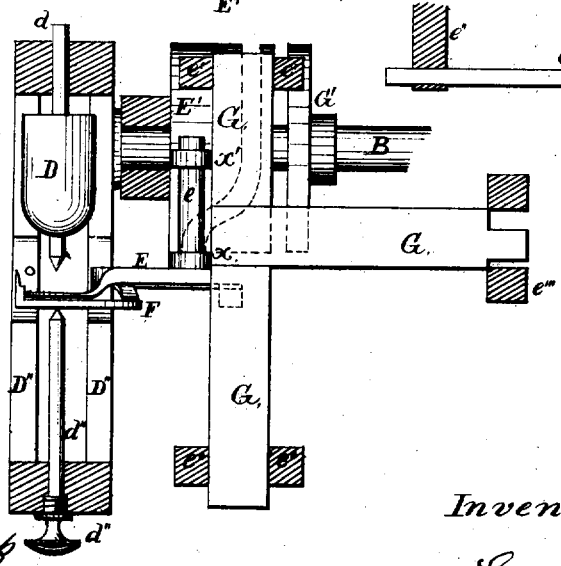
Figure 3:
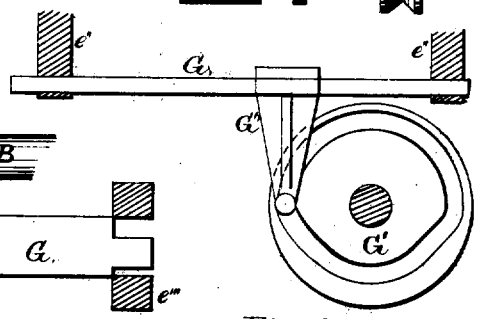

Figure 1 is a section and side elevation of the machine complete. Fig. 2 is a plan view from the top, showing the relative position of the shuttle, shuttle-race, loop-spreading hooks, and cams. Fig. 3 is a back view of the hook-bearing frame and the cam, which gives it a lateral motion. Fig. 4 is a vertical section through the axis of the shuttle-race. Fig. 5 is a vertical section through the longitudinal axis of the machine, showing another position of the hooks. Fig. 6 is a front view of the hooks before going down. Fig. 7 is a front view of the loop-spreading hooks after having drawn the thread down. Fig. 8 is a view of the shuttle, showing the tension. Fig. 9 is a view of the shuttle, showing its connection with the shuttle-driver.

A is the frame of the sewing-machine; B, the driving shaft. C is the needle-bar; D, the shuttle sliding over the rods *d d'*. D' is the shuttle-driver moving in grooves provided for it in the parallel frames D'' D''. To the shaft B are fastened the driving-pulley J, the needle-arm cam C'', the cam G' moving the T-frame G, the cam E' actuating the hook E, the face-plate H, to which is attached the shuttle-pitman H'', and the feed apparatus I. The shuttle D, Figs. 4, 8, and 9, is made in two parts. One, *m*, the shell, is cylindrical; the other, *n*, is the cover, and of a hemispherical shape. The shell *m* is provided with a central tube, *t*, extending the full length of the shuttle. The shuttle is closed after placing the spool *b* over the tube *t*, by screwing the cover *n* on the tube *t*. The thread goes from the spool *b* out of the shell *m* by the hole O, thence under the tension-spring S, and through the other hole O'. To the back of the shuttle are fastened two prongs, *p p'*, Fig. 9, connecting the shuttle with the prong *p''* of the shuttle-driver D'. The prong *p* overlaps *p''*, and the other, *p'*, merely prevents the shuttle from turning around and escaping from the shuttle-driver. Play enough is left in the fitting of the parts *p p' p''* to allow the free exit of the needle-thread from under the shuttle. The two rods *d d'* are the race or guides of the shuttle. They are in the same line, and have space enough left between their points to allow the play of the hooks and needle-thread. One of the rods, *d*, is fastened to the bed of the machine, and the other, *d'*, is provided with a thread and thumb-screw, *d''*, so as to be easily removed to take out the shuttle. The shuttle-driver D', guided in the grooves in D'' D'', is connected with the crank-pin H' on the face-plate H by pitman H''.

The hook E, Figs. 1 and 5, oscillates in a plane perpendicular to the shuttle-race, and is riveted to the stem *e* fitted in the bearings *x x'*. These bearings *x* and *x'* are fastened to a sort of T-frame, G, Figs. 1, 2, and the frame G is held against the bed A in three places, *e' e'' e'''*. The bearings *e' e''* guide its motion in a line parallel to the race, and the other bearing *e'''* holds it against the bed without interfering with its lateral motion, which is given by the cam G' acting on the roll and stand G''. The hook F is fastened to the hook E by the joint *f*. The lower extremity *f'* of hook F is provided with a roll and kept in contact with the guide *f''* by means of spiral spring *f'''* fastened to the T-frame G.

We see that the hooks can take two motions—one lateral with the T-frame G, and the other vertical—by the action of cam E' and guide *f''*. As the hook E is moving laterally with the frame G the groove in the cam G' is made very deep, and the roll $e^{iv}$ very long, to enable it to keep in the groove. $p^3$ and $p^4$ are the cast-off pins—one, $p^3$, is fastened to the frame D'', and the other, $p^4$, to the bed A.

Now, if we look at the machine at that particular time of the revolution immediately after the needle has thrown out the loop, as shown in Figs. 1, 2, and 4, we see that both hooks are pressed together as one, and stand up on the right of the needle. The shaft revolving the cam G′ gives to the frame G and consequently to the hooks a lateral motion. They enter the loop about a quarter of an inch, Fig. 6, and immediately after the cam E′ drives the hook E downward, leading the hook F with it; but the movement of the hook F is made nearly straight across and perpendicular to the race by the action of the guide $f''$ and spring $f'''$ on the roll $f'$, and when the action of the cam E′ ceases the hooks are in the position seen in Figs. 5 and 7, holding the needle-thread in a triangular shape in front of the shuttle, and very near the cast-off pins $p^3$ and $p^4$. The shuttle goes through the loop, and at the same time begins the reciprocating lateral motion of the hooks; but the thread bearing against the cast-off pins $p^3$ and $p^4$, Figs. 5 and 7, cannot follow the movement of the hooks, and, consequently, slips over them, and is cast off at the same time that the back of the shuttle passes in front of the needle.

Now the needle goes upward, the thread is taken up, and the shuttle comes back. Before it reaches the end of the stroke the hooks are moving upward, and when the shuttle is ready to come again the two hooks are together again on the right of the needle and about to enter the loop, as shown before.

It is also evident that a greater number of hooks could be used to effect the same purposes; but two have been found sufficient for good practical work. Nevertheless, if I found it necessary to throw the shuttle through the loop without touching it at all, I would then use three hooks instead of two, and it would then hold the thread in the shape of a square instead of a triangle.

By the foregoing construction of parts the loop which is thrown down by the needle is spread, so as to allow the shuttle to pass through it, thereby permitting the use (for the shuttle-thread) of the ordinary spools of thread just as they are sold in the market.

Having thus described the machine and the action of its parts, what I claim as new, and desire to secure by Letters Patent, is—

1. The combination, with the needle carrying the upper thread, of the loop-spreading hooks and operating mechanism, substantially as described, whereby the said hooks have imparted to them a vertical movement and also a lateral movement parallel to the shuttle-race, substantially as and for the purposes set forth.

2. The combination of the hooks E F, cams E′ G′, frame G, and guide $f''$, substantially as and for the purpose described.

3. The combination of the hooks E F, cams E′ G′, guide $f''$, and spring $f'''$ with the shuttle D, the pin $p^3$ on the shuttle-frame, and the pin $p^4$ on the under side of the bed-plate A, all substantially as set forth.

4. The combination, with the loop-spreading hooks E F, having a vertical movement and a lateral movement parallel to the shuttle-race, the cast-off pins $p$ $p'$, arranged and operating substantially as described and shown.

5. The combination of the shuttle, having a hollow tube through its center, the rods $d$ $d'$, separated from each other in the center, the hooks E F, cams E′ G′, frame G, guide $f''$, and spring $f'''$, all substantially as set forth.

In witness whereof I have hereunto set my hand and seal.

EUGÈNE MOREAU. [L. S.]

Witnesses:
C. W. M. SMITH,
PHILIP MAHLER.